United States Patent
Hisano (10) Patent No.: US 8,736,247 B2
(45) Date of Patent: May 27, 2014

(54) POWER SUPPLY CIRCUIT AND CONTROL METHOD OF CONTROLLING THE POWER SUPPLY CIRCUIT

(75) Inventor: Haruhiko Hisano, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 781 days.

(21) Appl. No.: 12/453,547

(22) Filed: May 14, 2009

(65) Prior Publication Data

US 2009/0309568 A1 Dec. 17, 2009

(30) Foreign Application Priority Data

Jun. 17, 2008 (JP) ................................. 2008-158275

(51) Int. Cl.
*G05F 1/656* (2006.01)
*G05F 1/70* (2006.01)

(52) U.S. Cl.
USPC ............ 323/311; 323/284; 323/285; 307/110

(58) Field of Classification Search
USPC ......... 323/282, 233, 217, 223, 224, 225, 311, 323/284, 285; 363/59–60; 307/110; 327/536
See application file for complete search history.

(56) References Cited

U.S. PATENT DOCUMENTS

| | | | | |
|---|---|---|---|---|
| 5,745,354 A | * | 4/1998 | Raza | 363/60 |
| 5,889,428 A | * | 3/1999 | Young | 327/536 |
| 5,905,369 A | * | 5/1999 | Ishii et al. | 323/272 |
| 6,326,959 B1 | * | 12/2001 | Tanaka | 345/211 |
| 6,791,212 B2 | * | 9/2004 | Pulvirenti et al. | 307/113 |
| 7,161,331 B2 | * | 1/2007 | Wai et al. | 323/222 |
| 2008/0094041 A1 | * | 4/2008 | Gerber | 323/233 |
| 2008/0129258 A1 | * | 6/2008 | Taurand | 323/271 |

FOREIGN PATENT DOCUMENTS

JP 2002-32131 1/2002

* cited by examiner

*Primary Examiner* — Adolf Berhane
*Assistant Examiner* — Nusrat Quddus
(74) *Attorney, Agent, or Firm* — McGinn IP Law Group, PLLC (57) ABSTRACT

A power supply circuit is provided which includes a first booster to boost a power supply voltage supplied from a battery and generate a first boosted voltage, a second booster to boost the power supply voltage at a higher multiplication factor than the first booster and generate a second boosted voltage, a power supply selection circuit to output the first boosted voltage or the second boosted voltage, a first smoothing capacitor placed at an output end of the power supply selection circuit, and a second smoothing capacitor placed at an output end of the second booster.

19 Claims, 6 Drawing Sheets

POWER SUPPLY CIRCUIT AND CONTROL METHOD OF CONTROLLING THE POWER SUPPLY CIRCUIT

BACKGROUND

1. Field of the Invention

The present invention relates to a power supply circuit and a control method of the same and, particularly, to a power supply circuit using a battery as a power supply and a control method of the same.

2. Description of Related Art

In mobile apparatus, a variety of devices such as a display device are driven using a power supply voltage that is supplied from an internal battery. Battery life is one of the most important considerations when a user chooses a mobile apparatus. Thus, a mobile apparatus with long battery life is advantageous in terms of apparatus choice. Recently, various developments have been made to elongate the battery life of mobile apparatus.

Although only one power supply voltage is supplied from a battery, a mobile apparatus incorporating a display device generally requires a plurality of voltages including a voltage higher than the power supply voltage of the battery in order to drive the display device. The voltage higher than the power supply voltage from the battery is generally generated using a boosting circuit. The boosting circuit receives the power supply voltage from the battery and generates an output voltage that is higher than the power supply voltage.

The power supply voltage of the battery decreases while driving the mobile apparatus with the battery. Accordingly, the output voltage of the boosting circuit to which a multiplication factor is set on the basis of the initial power supply voltage of the battery decreases as the voltage of the battery decreases. When the output voltage of the boosting circuit falls below a prescribed voltage value that is necessary for driving the mobile apparatus, the mobile apparatus stops operating, considering that the battery life runs out.

Even though the mobile apparatus stops operating, energy remains in the actual battery because the output voltage of the boosting circuit merely becomes lower than the prescribed voltage value in this state. Therefore, the battery life can be elongated by increasing the boosting factor of the boosting circuit. However, if the voltage is boosted with a large multiplication factor from the beginning, it is necessary to increase the dielectric strength of parts to which the boosted voltage is supplied, which is not economical. As an approach to such an issue, a technique for elongating battery life by increasing the multiplication factor of the boosting circuit when the power supply voltage of the battery becomes lower than the prescribed value is disclosed in Japanese Unexamined Patent Publication No. 2002-32131, for example.

Figure 6:
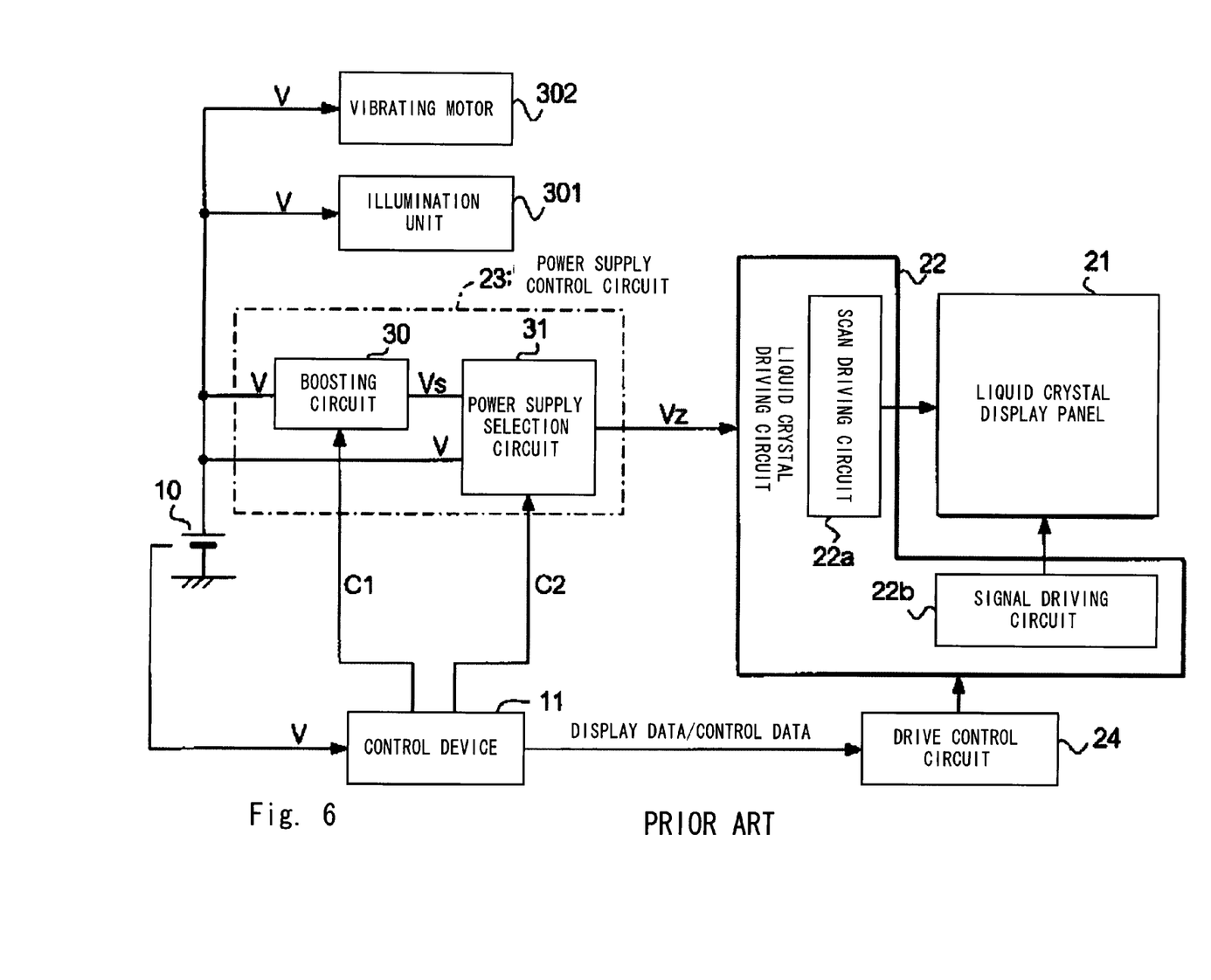
FIG. 6 is a block diagram showing the configuration of a power supply circuit according to prior art.

The power supply circuit according to prior art which is disclosed in Japanese Unexamined Patent Publication No. 2002-32131 is described hereinafter with reference to FIG. 6. FIG. 6 is a block diagram showing the configuration of the power supply circuit according to prior art. FIG. 6 shows the configuration of a liquid crystal display device, which is a component of an electronic clock, and the configuration to supply a power supply voltage to the liquid crystal display device. As shown in FIG. 6, a liquid crystal display device 204 includes a liquid crystal display panel 21, a liquid crystal driving circuit 22, a power supply control circuit 23 that supplies a driving voltage Vz for driving the liquid crystal display panel, and a drive control circuit 24 that controls the liquid crystal driving circuit 22 based on display data and various kinds of control data which are supplied from a control device 11 such as a CPU that controls an electronic clock 200 as a whole. FIG. 6 shows the configuration where a secondary battery 10 supplies a power supply voltage not only to the liquid crystal display device 204 but also to other loads such as an illumination unit 301 and a vibrating motor 302.

The liquid crystal driving circuit 22 includes a scan driving circuit 22a that drives a scan electrode (common electrode) of the liquid crystal display panel 21 and a signal driving circuit 22b that drives a signal electrode (segment electrode) of the liquid crystal display panel 21. The scan driving circuit 22a and the signal driving circuit 22b respectively drive the electrodes of the liquid crystal display panel 21 according to a control signal from the drive control circuit 24, so that images are displayed on the liquid crystal display panel 21.

The power supply control circuit 23 includes a boosting circuit 30 and a power supply selection circuit 31. A power supply voltage V from the secondary battery 10 is supplied to both of the boosting circuit 30 and the power supply selection circuit 31. The power supply selection circuit 31 is supplied not only with the power supply voltage V from the secondary battery 10 but also with a boosted voltage Vs that is boosted by the boosting circuit 30. The power supply selection circuit 31 selects one of the power supply voltage V supplied from the secondary battery 10 and the boosted voltage Vs supplied from the boosting circuit 30 and supplies the selected voltage to the liquid crystal driving circuit 22 as a driving voltage Vz for driving the liquid crystal display panel 21. The selection by the power supply selection circuit 31 is controlled by the control device 11, and the selection is switched when a control signal C2 is supplied from the control device 11. Further, the boosting circuit 30 is also controlled by the control device 11, and the boosting circuit 30 starts operating when a control signal C1 is supplied from the control device 11.

Figure 7:
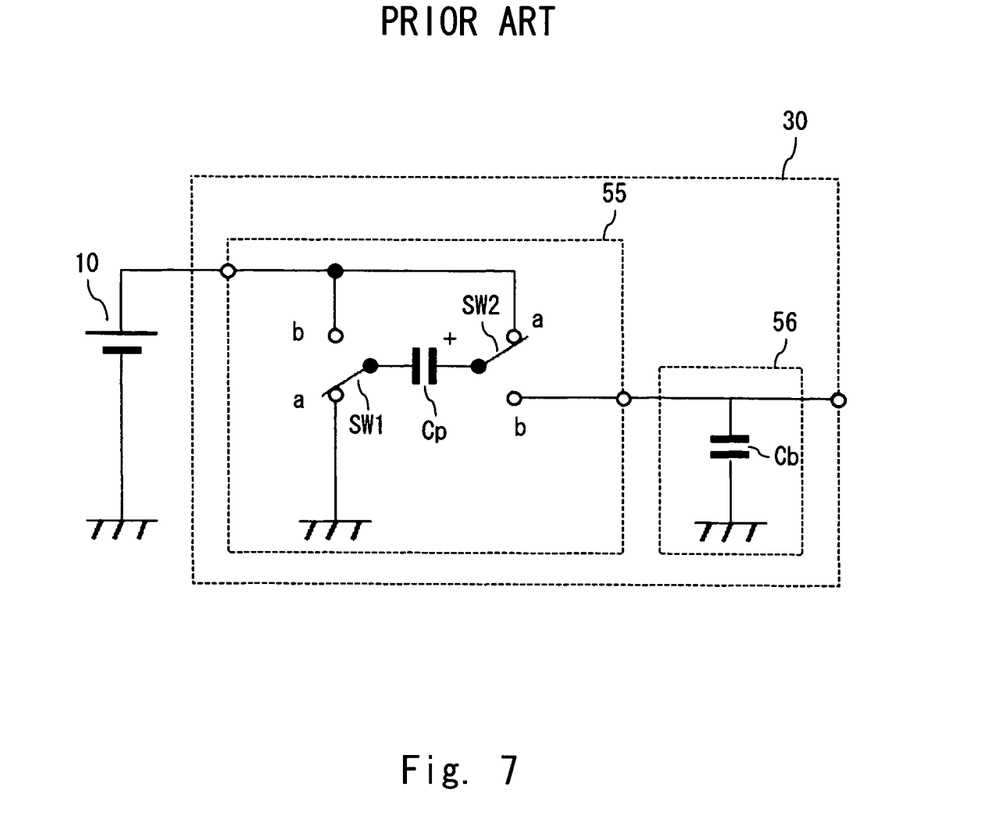
FIG. 7 is a circuit diagram showing a boosting circuit used in the power supply circuit according to prior art.

The boosting circuit 30 is described hereinafter in detail with reference to FIG. 7. FIG. 7 is a circuit diagram showing the boosting circuit 30. As shown in FIG. 7, the boosting circuit 30 is a charge pump boosting circuit that includes a double booster 55 including switches SW1 and SW2 and a pump capacitor Cp and a smoothing capacitor 56 including a backup capacitor Cb.

The switches SW1 and SW2 are interlock switches, and when the control signal C1 is supplied from the control device 11, the state where the switches SW1 and SW2 are connected to the side a and the state where the switches SW1 and SW2 are connected to the side b are switched according to a prescribed operating frequency. As a result that the switches SW1 and SW2 are repeatedly switched, the state where the voltage V is charged to the capacitor Cp and the state where the capacitor Cp and the capacitor Cb are connected in parallel and charge is transferred from the capacitor Cp to the capacitor Cb are switched. As a result that those states are repeatedly switched, the power supply voltage that is supplied from the secondary battery 10 is boosted double.

In the power supply circuit according to prior art, when the power supply voltage V of the secondary battery 10 falls below the driving voltage Vz for driving the liquid crystal display panel 21, the output V of the secondary battery 10 and the output Vs of the boosting circuit 30 are switched by the power supply selection circuit 31. It is thereby possible to use the secondary battery 10 for a longer time.

As described above, in the power supply circuit according to prior art, the output of the secondary battery 10 and the output of the boosting circuit 30 are switched by the power supply selection circuit 31. However, the present inventor has found that the following problem occurs when switching between a plurality of boosting circuits with different output voltages by the power supply selection circuit in the power supply circuit according to prior art.

In the power supply circuit according to prior art, a smoothing capacitor is connected to the output end of a boosting circuit. Particularly, a boosting circuit that is used in a display driver for mobile apparatus requires a high-capacitance external capacitor. When switching the output of the boosting circuit by the power supply selection circuit, the charge charged in the smoothing capacitor is abandoned, which is significant waste of power.

Further, when switching from a boosting circuit that generates a low boosted voltage to a boosting circuit that generates a high boosted voltage, the power supply voltage rises abruptly at the output of the power supply selection circuit, which may cause an adverse effect on loads. An abrupt change in the power supply voltage of the entire circuit may cause malfunction such as an abrupt flow of current into a part of the circuit.

SUMMARY

A first exemplary aspect of an embodiment of the present invention is a power supply circuit that includes a first boosting circuit to boost a power supply voltage supplied from a power supply and generate a first boosted voltage, a second boosting circuit to boost the power supply voltage at a higher multiplication factor than the first boosting circuit and generate a second boosted voltage, a switching circuit to output one of the first boosted voltage and the second boosted voltage, a first capacitor placed at an output end of the switching circuit, and a second capacitor placed at an output end of the second boosting circuit. In this configuration, when switching from the first boosted voltage to the second boosted voltage, it is possible to use, not abandon, charge charged in the first capacitor, thereby effectively reducing power consumption. Further, it is possible to prevent an abrupt change in the voltage output from the power supply circuit upon switching, thereby allowing stable rise in power supply.

A second exemplary aspect of an embodiment of the present invention is a control method of a power supply circuit including a first boosting circuit to boost a power supply voltage supplied from a power supply and generate a first boosted voltage and a second boosting circuit to boost the power supply voltage at a higher multiplication factor than the first boosting circuit and generate a second boosted voltage. The control method includes smoothing the first boosted voltage by a first capacitor when the power supply voltage is equal to or higher than a prescribed value, and smoothing the second boosted voltage by a second capacitor and the first capacitor when the power supply voltage is lower than the prescribed value. In this method, when switching from the first boosted voltage to the second boosted voltage, it is possible to use, not abandon, charge charged in the first capacitor, thereby effectively reducing power consumption. Further, it is possible to prevent an abrupt change in the voltage output from the power supply circuit upon switching, thereby allowing stable rise in power supply.

According to the exemplary aspects of an embodiment of the present invention described above, it is possible to provide a power supply circuit capable of preventing malfunction of apparatus and elongating battery life, and a control method of the same.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

An exemplary embodiment of the present invention will be described hereinbelow. The explanation provided hereinbelow merely illustrates an exemplary embodiment of the present invention, and the present invention is not limited to the below-described exemplary embodiment. The following description and the accompanying drawings are appropriately shortened and simplified to clarify the explanation. Further, redundant explanation is omitted as appropriate to clarify the explanation. In the figures, the identical reference symbols denote identical elements and the explanation thereof is omitted as appropriate.

Figure 1:
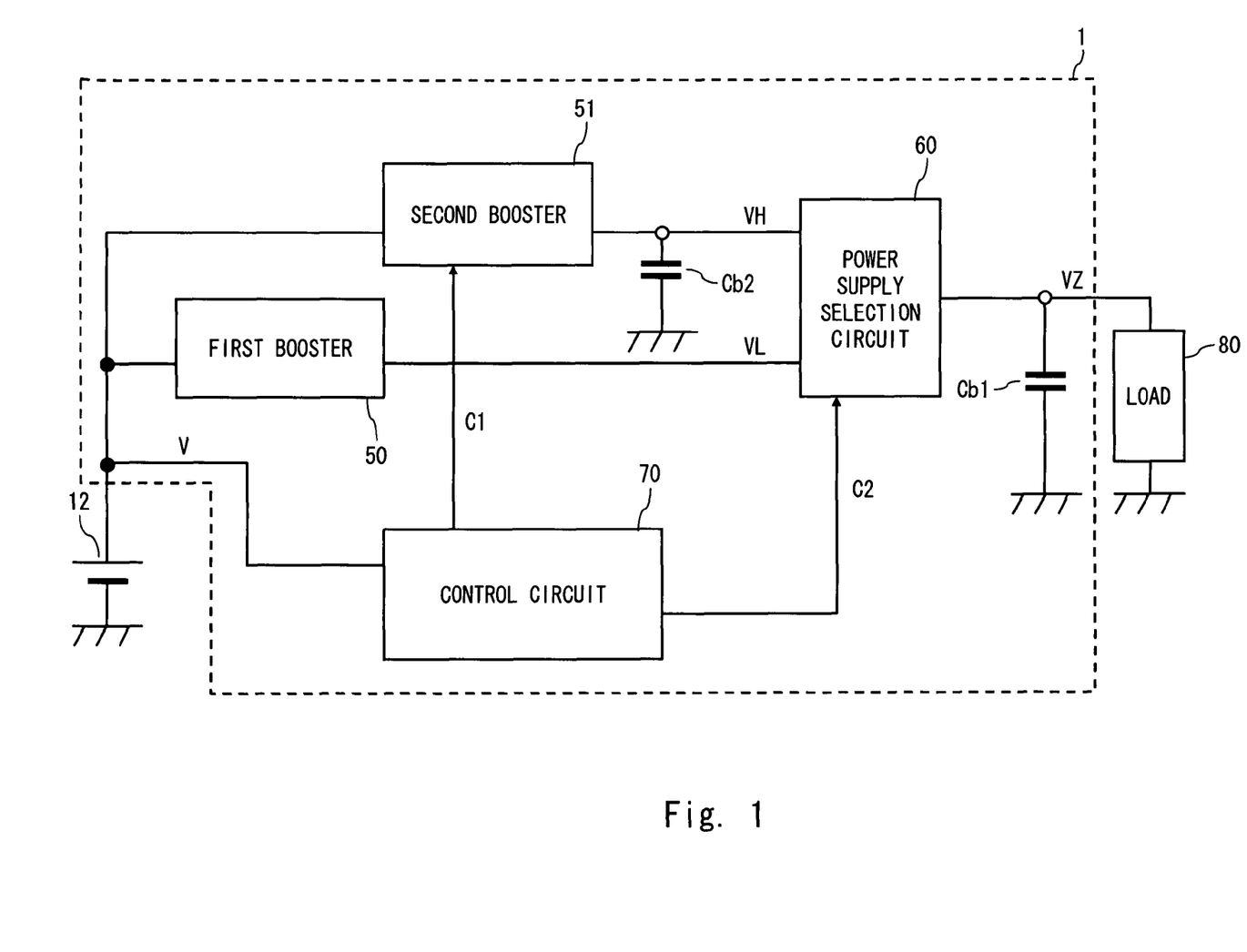
FIG. 1 is a block diagram showing the configuration of a power supply circuit according to an exemplary embodiment of the present invention.

The configuration of a power supply circuit according to an exemplary embodiment of the present invention is described hereinafter with reference to FIG. 1. FIG. 1 is a block diagram showing the configuration of a power supply circuit according to the exemplary embodiment. A power supply circuit 1 according to the exemplary embodiment controls supply of a voltage for driving a device such as a display device that includes a load 80 in an apparatus using a battery 12 as a power supply. Referring to FIG. 1, the power supply circuit 1 according to the exemplary embodiment includes a first booster 50, a second booster 51, a first smoothing capacitor Cb1, a second smoothing capacitor Cb2, a power supply selection circuit 60 and a control circuit 70.

A power supply voltage V from the battery 12 is supplied to both of the first booster (first boosting circuit) 50 and a second booster (second boosting circuit) 51. The first booster 50 generates a first boosted voltage VL based on the input power supply voltage V. The second booster 51 generates a second boosted voltage VH that is boosted at a higher boosting factor than the first booster 50 based on the input power supply voltage V. Although not shown in FIG. 1, the first booster 50 and the second booster 51 may be charge pump boosters that include switches and a pump capacitor like the double booster 55 shown in FIG. 7, for example. The boosting factor of the second booster 51 is set to be higher than the boosting factor of the first booster 50.

If a double booster is used as the first booster 50 and a triple booster is used as the second booster 51, for example, a double boosted voltage is generated as the first boosted voltage VL, and a triple boosted voltage is generated as the second boosted voltage VH. In other words, the first booster 50 generates the first boosted voltage VL by boosting the power supply voltage V supplied from the battery 12 to double. Further, the second booster 51 generates the second boosted voltage VH by boosting the power supply voltage V supplied from the battery 12 to triple.

Figure 2:
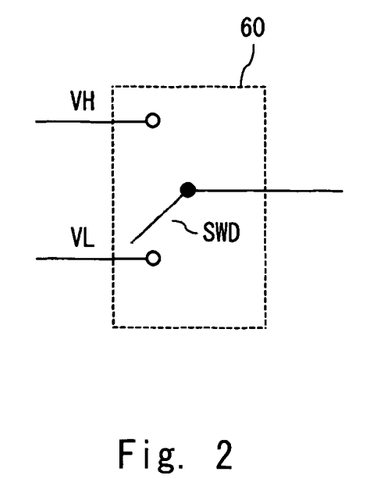
FIG. 2 is a circuit diagram showing an example of a power supply selection circuit used in the power supply circuit according to the exemplary embodiment of the present invention.

The power supply selection circuit 60 is supplied not only with the first boosted voltage VL boosted by the first booster 50 but also with the second boosted voltage VH boosted by the second booster 51. The power supply selection circuit 60 is described hereinafter in detail with reference to FIG. 2. FIG. 2 is a circuit diagram showing an example of the power supply selection circuit 60 that is used in the power supply circuit 1 according to the exemplary embodiment. As shown in FIG. 2, the power supply selection circuit 60 includes a power supply selection switch SWD capable of switching according to a control signal C2 supplied from the control circuit 70. When the power supply selection switch SWD is connected to a VL terminal, the power supply selection circuit 60 outputs the first boosted voltage VL. On the other hand, when the power supply selection switch SWD is connected to a VH terminal, the power supply selection circuit 60 outputs the second boosted voltage VH. In this manner, the power supply selection circuit 60 is a switching circuit that selects one of the first boosted voltage VL supplied from the first booster 50 and the second boosted voltage VH supplied from the second booster 51 and outputs the selected voltage.

In this exemplary embodiment, the first smoothing capacitor (first capacitor) Cb1 is connected to the output end of the power supply selection circuit 60, and the second smoothing capacitor (second capacitor) Cb2 is connected to the output end of the second booster 51. Therefore, when the power supply selection switch SWD is connected to the VL terminal, the first boosted voltage VL that is output from the power supply selection circuit 60 is smoothed by the first smoothing capacitor Cb1. Thus, the output terminal VZ of the power supply selection circuit 60 can hold the first boosted voltage VL by the first smoothing capacitor Cb1. On the other hand, when the power supply selection switch SWD is connected to the VH terminal, the second boosted voltage VH that is output from the second booster 51 is smoothed by the first smoothing capacitor Cb1 and the second smoothing capacitor Cb2. Thus, the output terminal VZ of the power supply selection circuit 60 can hold the second boosted voltage VH by the first smoothing capacitor Cb1 and the second smoothing capacitor Cb2.

Figure 3:
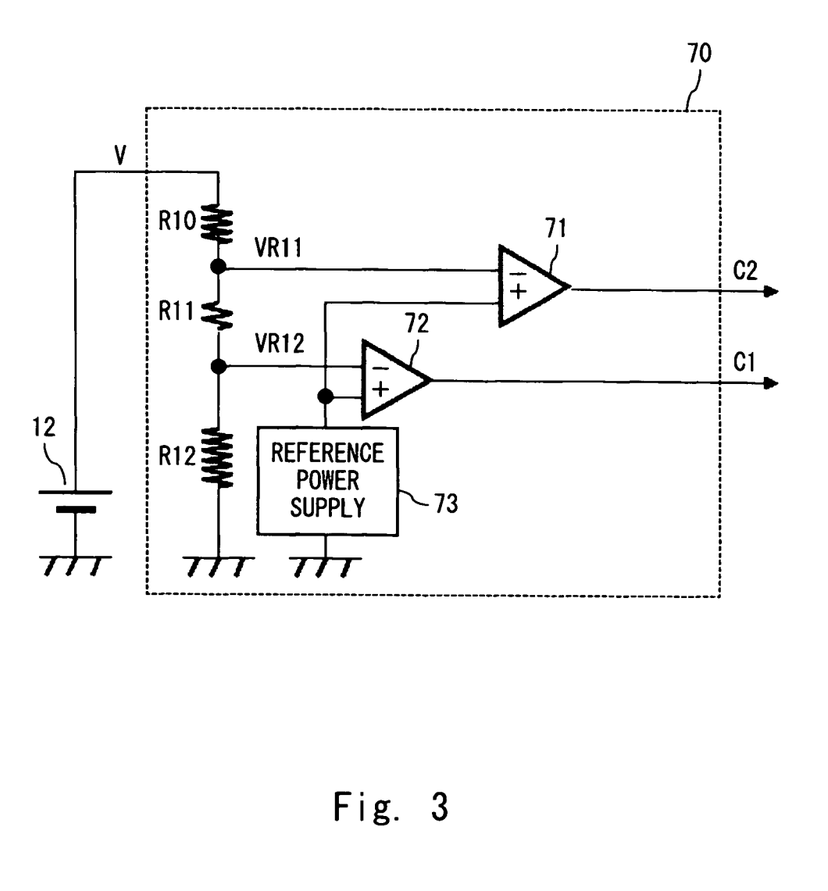
FIG. 3 is a circuit diagram showing an example of a control circuit used in the power supply circuit according to the exemplary embodiment of the present invention.

The second booster 51 and the power supply selection circuit 60 described above are controlled by the control circuit 70. The control circuit 70 is described hereinafter in detail with reference to FIG. 3. FIG. 3 is a circuit diagram showing an example of the control circuit 70 that is used in the power supply circuit 1 according to the exemplary embodiment. The control circuit 70 includes resistors R10, R11 and R12, comparators 71 and 72, and a reference power supply 73 as shown in FIG. 3, for example.

The + input terminal of the comparator 71 is connected to the reference power supply 73, and the − input terminal of the comparator 71 is connected to a node between the resistor R10 and the resistor R11. When a voltage VR11 between the resistor R10 and the resistor R11 becomes lower than a voltage of the reference power supply 73, the comparator 71 outputs the control signal C2 to the power supply selection circuit 60. When the control signal C2 is supplied from the control circuit 70, the power supply selection circuit 60 switches selection. Specifically, the comparator 71 detects the power supply voltage V of the battery 12 through the resistor R10 and supplies the control signal C2 to the power supply selection circuit 60 according to a detected value, thereby controlling the timing to switch the power supply selection switch SWD of the power supply selection circuit 60.

The + input terminal of the comparator 72 is connected to the reference power supply 73, and the − input terminal of the comparator 72 is connected to a node between the resistor R11 and the resistor R12. When a voltage VR12 between the resistor R11 and the resistor R12 becomes lower than a voltage of the reference power supply 73, the comparator 72 outputs the control signal C1 to the second booster 51. When the control signal C1 is supplied from the control circuit 70, the second booster 51 starts operating. Specifically, the comparator 72 detects the power supply voltage V of the battery 12 through the resistors R10 and R11 and supplies the control signal C1 to the second booster 51 according to a detected value, thereby controlling the timing to switch ON and OFF of the second booster 51.

Figure 4:
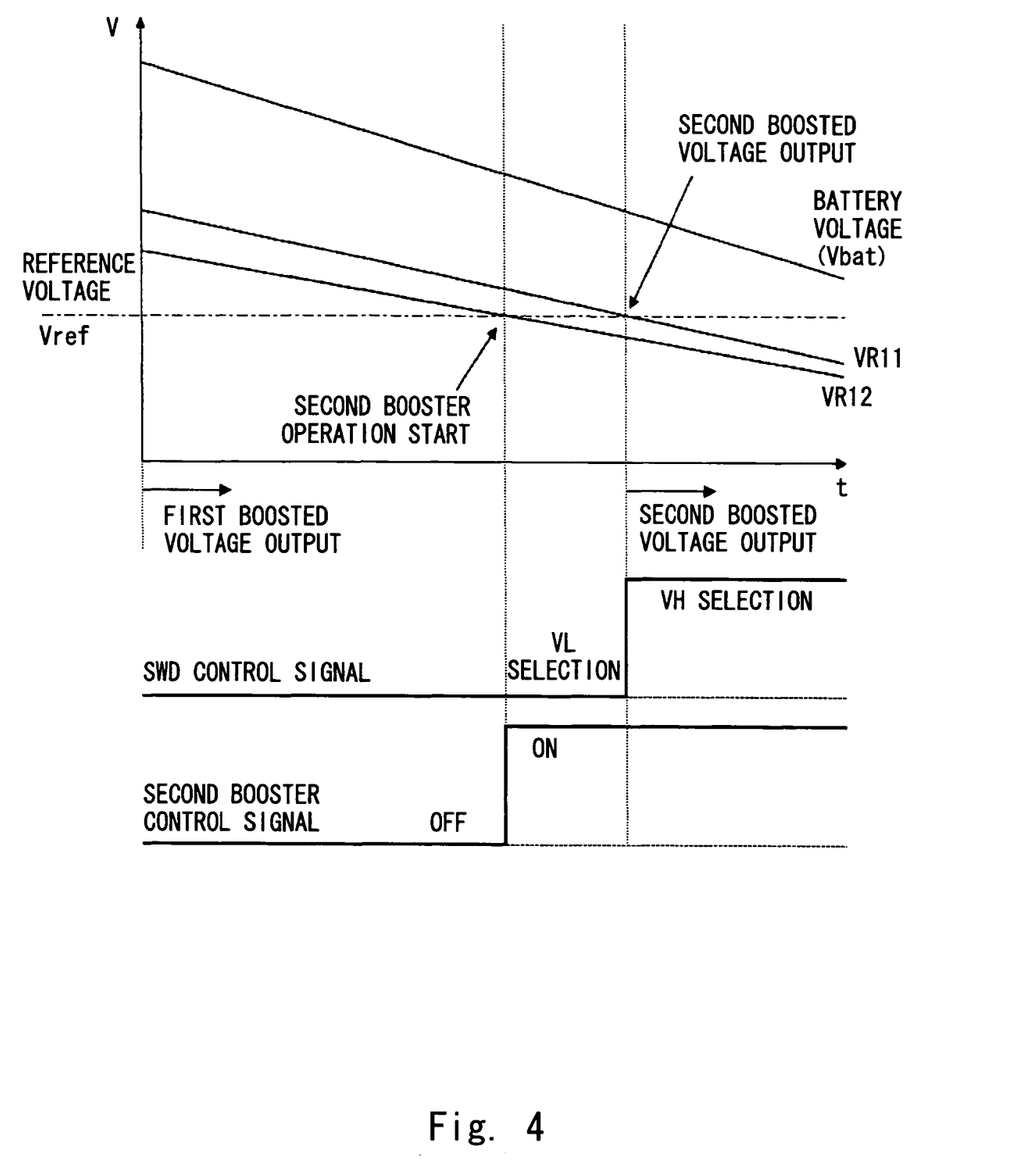
FIG. 4 is a timing chart of the power supply circuit according to the exemplary embodiment of the present invention.

A control method of the power supply circuit 1 according to an exemplary embodiment of the present invention is described hereinafter with reference to FIG. 4. FIG. 4 is a timing chart of the power supply circuit 1 according to the exemplary embodiment. As shown in FIG. 4, the power supply voltage V of the battery 12 decreases with time t. It is assumed in this example that the second booster 51 is OFF as initial setting. It is also assumed that the power supply selection switch SWD of the power supply selection circuit 60 is connected to the VL terminal, and the first boosted voltage VL from the first booster 50 is output from the power supply selection circuit 60. The first boosted voltage VL is thereby smoothed by the first smoothing capacitor Cb1, and the output terminal VZ of the power supply selection circuit 60 holds the first boosted voltage VL. If the first booster 50 is a double booster, for example, the output terminal VZ of the power supply selection circuit 60 holds a voltage that is boosted double as the first boosted voltage VL.

Then, when the voltage VR12 becomes lower than the voltage of the reference power supply 73 due to a voltage drop by consumption of the battery 12, the comparator 72 outputs the control signal C1. Specifically, the control circuit 70 outputs the control signal C1 to the second booster 51. The second booster 51 is thereby switched from OFF to ON. When the second booster 51 starts operating, the second booster 51 generates the second boosted voltage VH, and charge corresponding to the second boosted voltage VH is charged to the second smoothing capacitor Cb2.

After that, when the voltage VR11 becomes lower than the voltage of the reference power supply 73 due to a further voltage drop by consumption of the battery 12, the comparator 71 outputs the control signal C2. Specifically, the control circuit 70 outputs the control signal C2 to the power supply selection circuit 60. The power supply selection switch SWD in the power supply selection circuit 60 is thereby switched from the VL terminal to the VH terminal.

When the power supply selection switch SWD is connected to the VH terminal, the first smoothing capacitor Cb1 and the second smoothing capacitor Cb2 are connected in parallel in the power supply circuit 1 according to the exemplary embodiment. In this state, charge sharing occurs between the first smoothing capacitor Cb1 charged with the first boosted voltage VL and the second smoothing capacitor Cb2 charged with the second boosted voltage VH.

The voltage V(VZ) at the output terminal VZ of the power supply selection circuit 60 just after charge sharing is represented as follows:

$$V(VZ) = (Q(Cb1) + Q(Cb2))/(C(Cb1) + C(Cb2))$$

$$V(Cb1) = Q(Cb1)/C(Cb1)$$

$V(Cb2)=Q(Cb2)/C(Cb2)$

V(Cb1): the voltage of the first smoothing capacitor Cb1 just before charge sharing Q(Cb1): the charge accumulated in the first smoothing capacitor Cb1 just before charge sharing C(Cb1): the capacitance of the first smoothing capacitor Cb1

V(Cb2): the voltage of the second smoothing capacitor Cb2 just before charge sharing Q(Cb2): the charge accumulated in the second smoothing capacitor Cb2 just before charge sharing C(Cb2): the capacitance of the second smoothing capacitor Cb2

In this manner, the voltage V(VZ) just after charge sharing is a voltage between the voltage of the first smoothing capacitor Cb1 just before charge sharing and the voltage of the second smoothing capacitor Cb2 just before charge sharing.

After that, the second boosted voltage VH from the second booster 51 is smoothed by the first smoothing capacitor Cb1 and the second smoothing capacitor Cb2, and the output terminal VZ of the power supply selection circuit 60 holds the second boosted voltage VH. If the second booster 51 is a triple booster, for example, the output terminal VZ of the power supply selection circuit 60 holds a voltage that is boosted triple as the second boosted voltage VH.

As described above, the first smoothing capacitor Cb1 according to the exemplary embodiment smoothes the first boosted voltage VL when the power supply voltage V is equal to or higher than a prescribed value and further smoothes the second boosted voltage VH when the power supply voltage V is lower than the prescribed value.

Figure 5:
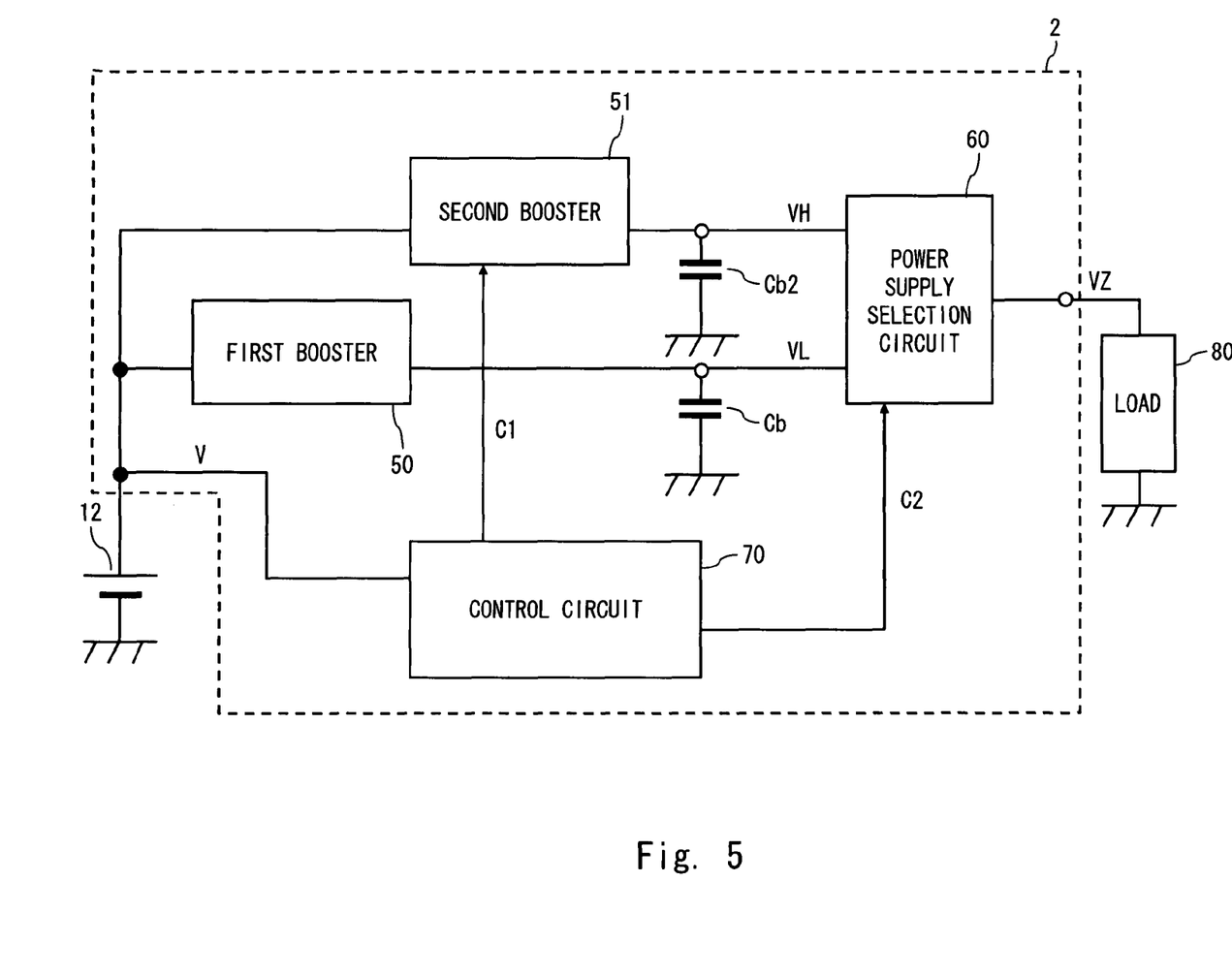
FIG. 5 is a block diagram showing the configuration of a power supply circuit according to a reference example.

A power supply circuit 2 shown in FIG. 5 is described as a reference example in comparison with the power supply circuit 1 according to the exemplary embodiment. FIG. 5 is a block diagram showing the configuration of the power supply circuit 2 according to the reference example. In the power supply circuit 2 according to the reference example, a first smoothing capacitor is placed in a different position from that of the power supply circuit 1 according to the exemplary embodiment. The other configuration is the same as that of the power supply circuit 1 and not described in detail below.

Referring to FIG. 5, the power supply circuit 2 includes the first booster 50, the second booster 51, a first smoothing capacitor Cb, the second smoothing capacitor Cb2, the power supply selection circuit 60 and the control circuit 70. In the reference example shown in FIG. 5, the first smoothing capacitor Cb is placed at the output end of the first booster 50. Therefore, when the power supply selection switch SWD of the power supply selection circuit 60 is connected to the VL terminal, the power supply selection circuit 60 outputs the first boosted voltage VL that is smoothed by the first smoothing capacitor Cb. Thus, the output terminal VZ of the power supply selection circuit 60 holds the first boosted voltage VL by the first smoothing capacitor Cb. On the other hand, when the power supply selection switch SWD is connected to the VH terminal, the power supply selection circuit 60 outputs the second boosted voltage VH that is smoothed by the second smoothing capacitor Cb2. Thus, the output terminal VZ of the power supply selection circuit 60 holds the second boosted voltage VH by the second smoothing capacitor Cb2.

A control method of the power supply circuit 2 is described hereinafter with reference back to FIG. 4 where necessary. It is assumed that the second booster 51 is OFF as initial setting. It is also assumed that the power supply selection switch SWD of the power supply selection circuit 60 is connected to the VL terminal. Thus, the first boosted voltage VL from the first booster 50 is smoothed by the first smoothing capacitor Cb and output from the power supply selection circuit 60. The output terminal VZ of the power supply selection circuit 60 thereby holds the first boosted voltage VL.

Then, when the voltage VR12 becomes lower than the voltage of the reference power supply 73 due to a voltage drop by consumption of the battery 12 as shown in FIG. 4, the control circuit 70 supplies the control signal C1 to the second booster 51. The second booster 51 is thereby switched from OFF to ON. When the second booster 51 starts operating, the second booster 51 generates the second boosted voltage VH, and charge corresponding to the second boosted voltage VH is charged to the second smoothing capacitor Cb2.

After that, when the voltage VR11 becomes lower than the voltage of the reference power supply 73 due to a further voltage drop by consumption of the battery 12, the control circuit 70 outputs the control signal C2 to the power supply selection circuit 60. The power supply selection switch SWD in the power supply selection circuit 60 is thereby switched from the VL terminal to the VH terminal.

When the power supply selection switch SWD is connected to the VH terminal, the first smoothing capacitor Cb is separated from the power supply selection circuit 60, and the second smoothing capacitor Cb2 is connected to the power supply selection circuit 60 in the power supply circuit 2 according to the reference example. Accordingly, the voltage at the output end of the power supply selection circuit 60 just after switching of the power supply selection switch SWD becomes the voltage of the second smoothing capacitor Cb2 just before switching. Then, the second boosted voltage VH from the second booster 51 is continuously smoothed by the second smoothing capacitor Cb2, and the output terminal VZ of the power supply selection circuit 60 holds the second boosted voltage VH.

As described above, in the power supply circuit 2 according to the reference example, the first smoothing capacitor Cb is separated at the time when the power supply selection switch SWD is switched from the VL terminal to the VH terminal. Thus, when switching the output of the booster by the power supply selection circuit 60, the charge charged in the first smoothing capacitor Cb is abandoned, which is significant waste of power. Further, the voltage that is output from the output terminal VZ of the power supply selection circuit 60 abruptly changes from the first boosted voltage VL to the second boosted voltage VH. The abrupt change may cause an adverse effect, such as malfunction, on the load 80.

On the other hand, in the power supply circuit 1 according to the exemplary embodiment, the second smoothing capacitor Cb2 and the first smoothing capacitor Cb1 are connected in parallel at the time when the power supply selection switch SWD is switched from the VL terminal to the VH terminal, and charge sharing occurs therebetween. Thus, when switching the output of the booster by the power supply selection circuit 60, it is possible to use, not abandon, the charge charged in the first smoothing capacitor Cb1. This effectively reduces power consumption, and it is thereby possible to elongate battery life. Further, the voltage that is output from the output terminal VZ of the power supply selection circuit 60 is smoothed into the second boosted voltage VH after becoming a voltage between the first smoothing capacitor Cb1 and the second smoothing capacitor Cb2. Specifically, because the charge charged in the second smoothing capacitor Cb2 is shared by the first smoothing capacitor Cb1, it is possible to prevent an abrupt change in the voltage that is output from the output terminal VZ of the power supply selection circuit 60, thus allowing stable rise in power supply. It is thereby possible to prevent malfunction and reduce an adverse effect on the load 80.

Although the power supply circuit 1 in which two boosting circuits are placed independently of each other is described above by way of illustration, the present invention may be applied to the case where a part of the circuit is shared. Further, although the case where the control circuit 70 is placed in the power supply circuit 1 is described above, the control circuit 70 may be placed in a control unit that controls the entire apparatus using the battery 12 as a power supply. Furthermore, although the power supply circuit 1 according to the exemplary embodiment includes two boosting circuits by way of illustration, the present invention is not limited thereto, and a step-down circuit may be used instead of the boosting circuit. The power supply circuit 1 that uses the step-down circuit instead of the boosting circuit has the same advantage as the power supply circuit 1 described above.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A power supply circuit comprising:
   a first boosting circuit to boost a power supply voltage supplied from a power supply and generate a first boosted voltage;
   a second boosting circuit to boost the power supply voltage at a higher multiplication factor than the first boosting circuit and generate a second boosted voltage;
   a switching circuit to output one of the first boosted voltage and the second boosted voltage;
   a first capacitor placed at an output end of the switching circuit; and
   a second capacitor placed at an output end of the second boosting circuit,
   wherein the first capacitor is connected between an output of the switching circuit and a load, and the second capacitor is connected between an output of the second boosting circuit and an input of the switching circuit.

2. The power supply circuit according to claim 1, wherein the switching circuit outputs the first boosted voltage when the power supply voltage is equal to or higher than a prescribed value, and outputs the second boosted voltage when the power supply voltage is lower than the prescribed value.

3. The power supply circuit according to claim 1, wherein the second boosting circuit starts operating before an output of the switching circuit switches from the first boosted voltage to the second boosted voltage.

4. The power supply circuit according to claim 1, wherein the first capacitor smoothes the first boosted voltage when the power supply voltage is equal to or higher than a prescribed value, and smoothes the second boosted voltage when the power supply voltage is lower than the prescribed value.

5. The power supply circuit of claim 1, wherein the switching circuit comprises a first input that receives the first boosted voltage.

6. A power supply circuit comprising:
   a first boosting circuit to boost a power supply voltage supplied from a power supply and generate a first boosted voltage;
   a second boosting circuit to boost the power supply voltage at a higher multiplication factor than the first boosting circuit and generate a second boosted voltage;
   a switching circuit to output one of the first boosted voltage and the second boosted voltage;
   a first capacitor placed at an output end of the switching circuit; and
   a second capacitor placed at an output end of the second boosting circuit,
   wherein the switching circuit comprises a first input that receives the first boosted voltage,
   wherein the switching circuit further comprises a second input for receiving the second boosted voltage.

7. The power supply circuit of claim 1, further comprising a control circuit that receives the power supply voltage and outputs a plurality of control signals.

8. The power supply circuit of claim 7, wherein the second boosting circuit receives one of the plurality of control signals from the control circuit and the switching circuit receives another of the plurality of control signals from the control circuit.

9. The power supply circuit of claim 8, wherein, before outputting the another of the plurality of control signals to the switching circuit, the control circuit outputs the one of the plurality of control signals to the second boosting circuit.

10. The power supply circuit of claim 7, wherein, when the power supply voltage falls below a prescribed value, the control circuit outputs one of the plurality of control signals to the second boosting circuit.

11. A power supply circuit comprising:
    a first boosting circuit to boost a power supply voltage supplied from a power supply and generate a first boosted voltage;
    a second boosting circuit to boost the power supply voltage at a higher multiplication factor than the first boosting circuit and generate a second boosted voltage;
    a switching circuit to output one of the first boosted voltage and the second boosted voltage;
    a first capacitor placed at an output end of the switching circuit; and
    a second capacitor placed at an output end of the second boosting circuit,
    wherein, when the switching circuit switches to output the second boosted voltage, the first capacitor maintains a charge from the first boosted voltage.

12. The power supply circuit of claim 1, further comprising a control circuit having a reference voltage,
    wherein, when the first boosted voltage is higher than the reference voltage, the switching circuit outputs the first boosted voltage, otherwise the switching circuit outputs the second boosted voltage.

13. The power supply circuit of claim 1, wherein the switching circuit comprises an output directly connected to the first capacitor.

14. The power supply circuit of claim 1, wherein, when the switching circuit outputs the second boosted voltage, the second boosted voltage passes through the first capacitor and the second capacitor.

15. The power supply circuit of claim 1, wherein, when the first boosted voltage falls below a prescribed value, the second boosting circuit begins operation and then the switching circuit outputs the second boosted voltage.

16. The power supply circuit of claim 1, wherein, when the switching circuit switches from the first boosting circuit to the second boosting circuit, the first boosted voltage is smoothed by the first capacitor.

17. The power supply circuit of claim 1, wherein the switching circuit comprises an output terminal, and when the switching circuit switches to the second boosting circuit, the output terminal holds the first boosted voltage.

18. The power supply circuit of claim 1, wherein the second capacitor is connected between the second boosting circuit and the switching circuit.

19. A power supply circuit comprising:
- a first boosting circuit to boost a power supply voltage supplied from a power supply and generate a first boosted voltage;
- a second boosting circuit to boost the power supply voltage at a higher multiplication factor than the first boosting circuit and generate a second boosted voltage;
- a switching circuit to output one of the first boosted voltage and the second boosted voltage;
- a first capacitor placed at an output end of the switching circuit; and
- a second capacitor placed at an output end of the second boosting circuit, wherein the first capacitor is connected to a ground potential at one end and another end of the first capacitor connected to the switching circuit is for connection to a load, and
  wherein the first capacitor and the second capacitor are connected in parallel when the switching circuit is in a certain state for charge sharing.

* * * * *